United States Patent [19]

Schlicker et al.

[11] Patent Number: 5,771,146

[45] Date of Patent: Jun. 23, 1998

[54] SAFETY CIRCUIT

[75] Inventors: Michael Schlicker, Reichshof-Denklingen; Frank Schmitz, Bergisch-Gladbach, both of Germany

[73] Assignee: Schneider Electric SA, Boulogne Billancourt, France

[21] Appl. No.: 725,715

[22] Filed: Oct. 4, 1996

[30] Foreign Application Priority Data

Oct. 4, 1995 [EP] European Pat. Off. .............. 95115622
Nov. 11, 1995 [EP] European Pat. Off. .............. 95117767

[51] Int. Cl.⁶ .................................................. H01H 47/32
[52] U.S. Cl. ........................... 361/166; 361/190; 307/326
[58] Field of Search .................................... 361/160, 166, 361/170, 189, 190, 191, 192, 193; 307/326, 328; 192/131 R, 129 A

[56] References Cited

U.S. PATENT DOCUMENTS

| | | | |
|---|---|---|---|
| 3,315,243 | 4/1967 | Weiberg | 307/328 |
| 3,371,254 | 2/1968 | Hagfors | 361/189 |
| 3,793,533 | 2/1974 | Ginsberg | 361/189 |
| 3,914,621 | 10/1975 | Passarelli, Jr. et al. | 361/189 |
| 4,412,268 | 10/1983 | Dassow | 361/181 |
| 5,235,217 | 8/1993 | Kirton | 307/326 |

FOREIGN PATENT DOCUMENTS

| | | |
|---|---|---|
| 0 105 054 | 4/1984 | European Pat. Off. . |
| 1 926 607 | 4/1970 | Germany . |
| 36 00 173 | 7/1987 | Germany . |

*Primary Examiner*—Fritz Fleming
*Attorney, Agent, or Firm*—Oblon, Spivak, McClelland, Maier & Neustadt, P.C.

[57] ABSTRACT

Safety circuits with an actuating device for electrical appliances, where the actuating device is capable of being operated by means of two key buttons or switch stacks are of use in many different areas of application. In order to create a generally suitable safety circuit, which is very simple and clear and which therefore brings with it low costs, which however stands up to all safety criteria, including the avoidance of any manipulation it is proposed that the two key buttons (S1, S2) each have a break contact (s1ö, s2ö) and a make contact (s1s, s2s) and act in combination with an associated driver stage (2), preferably a transistor driver stage with transistors (Q1, Q2, Q3, Q4), that the driver stage has two relays (K1, K2), that an astable circuit or multivibrator (1) with an elementary frequency of about 1000 Hz for the generation of two complementary square wave signals is connected to the relays (K1, K2) via contacts (k1, k2) so that the relays (K1, K2) are dynamically switchable.

10 Claims, 1 Drawing Sheet

SAFETY CIRCUIT

BACKGROUND OF THE INVENTION

1 Field of the Invention

This invention relates to a safety circuit with an actuating device for electrical appliances, whereby the actuation device is capable of being operated by means of two key buttons or switch stacks. Many different areas of application are to be understood by the term electrical appliances, that is, the invention may be applied to all electrical safety devices with two separate electrical key buttons or switch stacks used for guard circuits, such as those used with light grids or guard doors, for example to mechanical plant, emergency monitoring, limit switch monitoring, floor mats, light curtains and the like. Presses, stamping machines, milling machines, lathes or winding devices may be Noted as examples of mechanical plant.

2 Discussion of Background

In the practice and from the state of the technology, several designs of safety circuits are known of the type described above and in fact used in combination with electrical appliances or machines, where, in the switched on state, dangerous conditions exist for operating personnel, in particular dangerous machine motion. A two handed actuation is used to switch to the dangerous condition which should guarantee that both hands of the operator are occupied and every possibility is ruled out for intervening with either hand in the space where the danger is being brought about. At the same time, it should guarantee that the operator or his/her legs are in a place where there is no danger to the operator during the dangerous motion. In connection with this one strives with known safety circuits to ensure that any manipulation is ruled out by the two handed actuation. Furthermore one strives to ensure that the safety circuit works perfectly, so that only then is through switching at the consumer terminals i.e. switching to the dangerous operating condition, possible and that on the other hand if any fault arises within the circuit, through switching is certain to be prevented. The electrical safety circuits known until now either do not fulfil all the safety criteria or they are structured in a complicated way and are expensive to build so that they require very high expenditure and a safety risk is apparent in the complexity of the construction.

The invention is based on the task of creating a safety circuit with general application and which is simply and clearly structured therefore signifying low expense but which however meets all the safety criteria including the prevention of any kind of manipulation.

SUMMARY OF THE INVENTION

In an advantageous embodiment of the invention, a capacitor is provided, which is so dimensioned that, in a position of equilibrium, it stores the energy that is required to provide the astable circuit or multivibrator with a voltage within the maximum 500 ms actuation time of the two key buttons.

In this connection, it is advantageous that with the actuation of the two key buttons within an actuation time of 500 ms, the driver stage is supplied with voltage V+ and V− via the make contacts of the key buttons and the relays are activated. In the circuit, the capacitor is integrated into the astable circuit or multivibrator.

Preferably, the astable circuit or multivibrator generates square wave signals with an edge steepness of up to 10 $\mu$, preferably smaller than 1 $\mu s$, whereby there is a pulse duty factor $T_{in}$ to $T_{out}$ of 50% to 50%.

According to a further characteristic of the invention, a first diode is provided between the first key button and the driver stage and a second diode is provided between the second key button (S2) and the driver stage whereby the diodes block the flow of current to the driver stage when the key buttons are inoperative.

Furthermore, in an advantageous extension of the safety circuit according to the invention, it is provided that the square wave signals from the astable circuit or multivibrator trigger the driver stage in such a way that the square wave signals are alternately high and low, so that either the first or the second relay is energised and these relays are thus dynamically switchable in response to the square wave signals.

According to a further characteristic of the invention, it is provided that the astable circuit or multivibrator are supplied with power via the relay make contacts if the relays are activated.

Finally with the safety circuit according to the invention, it is provided that the two complementary square wave signals persist over similar lengths of time and are inverse to one another.

BRIEF DESCRIPTION OF THE DRAWING

A preferred design form of the safety circuit according to the invention is shown in the drawing, the structure and function of which is described below.

DESCRIPTION OF THE PREFERRED EMBODIMENT

Figure 1:
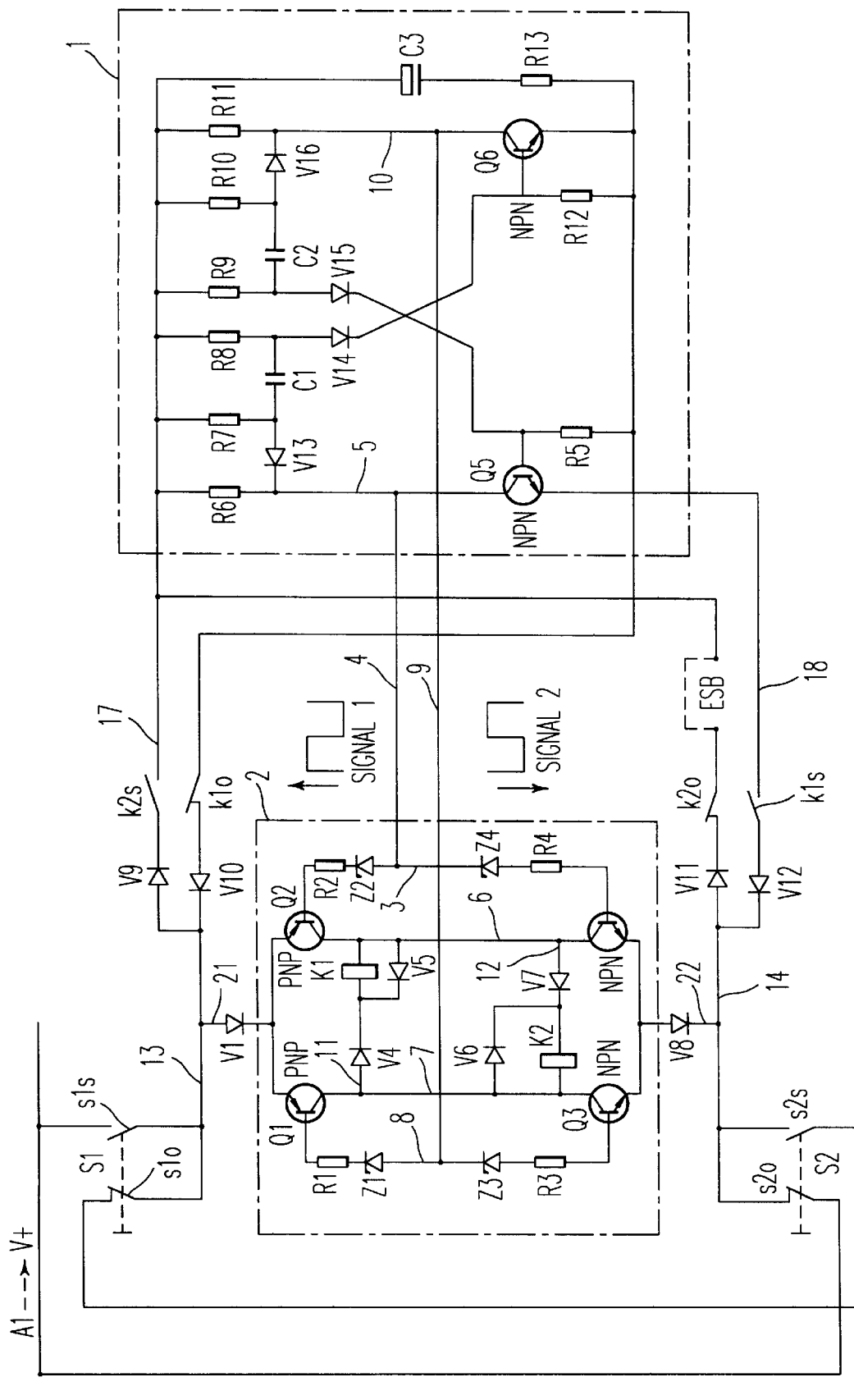

The safety circuit shown in the drawing essentially comprises a driver stage 2 shown in the rectangle marked in the dot and dash pattern and an astable circuit or multivibrator 1 which is similarly enclosed in a rectangle of dot and dash lines on the drawing and is connected to the driver stage 2 as will be explained in detail below.

The driver stage 2 is operated in combination with two key buttons S1 and S2 of an actuation device, for example with two handed actuation, not shown in detail. The two key buttons S1 and S2 are to be operated as simultaneously as possible, at least within the short actuation time further commented on in more detail below. The electrical voltage V+ or V− is supplied to the driver stage 2 via key buttons S1 and S2. The driver stage 2 has two PNP transistors Q1 and Q2 and two NPN transistors Q3 and Q4. The bases of the PNP transistor Q2 and the NPN transistor Q4 are connected to one another by line 3, in which two resistances R2 and R4 and two Zener diodes Z2 and Z4 are connected in series. Furthermore, between the Zener diodes Z2 and Z4, which are connected series aiding and in their conducting direction from resistance R4 to resistance R2, a line 4 is connected, which connects the driver stage 2 with the astable circuit or multivibrator 1 and which transmits Signal 1 which will be further explained in detail below whereby line 4 is connected in the multivibrator to a line 5, which connects resistance R6 with the collector of transistor Q5.

Furthermore, the collector of PNP transistor Q2 is connected to the collector of NPN transistor Q4 via a line 6. The emitter of NPN transistor Q4 is, on the other hand, connected to the emitter of NPN transistor Q3, whose collector is connected to the collector of PNP transistor Q1 by a line 7. The emitter of PNP transistor Q1 is furthermore connected to the emitter of PNP transistor Q2. The PNP transistor Q1 and NPN transistor Q3 are in addition connected via a line 8 which is connected to the bases of the previously mentioned transistors Q1 and Q3. Two resistances are connected into line 8 between which Zener diodes Z1 and Z3 are connected. Between Zener diodes Z1 and Z3, line 9 is connected which connects line 8 in the driver stage 2 with a line 10 in the astable circuit or multivibrator 1, whereby line 10 runs between the resistance R11 and the collector of NPN transistor Q6. Signal 2 which will be explained below is transmitted via line 9.

Two relay-diode combinations are connected between lines 6 and 7, whereby a diode V4 and a relay K1 are connected in a line 11, whereby the conducting direction of these diodes runs from the collector of PNP transistor Q1 towards the collector of NPN transistor Q4. A recovery diode V5 is connected in parallel with relay K1, whose conducting direction is opposed to the conducting direction of diode V4.

The second relay-diode combination comprises a line 12, in which a diode V7 and a relay K2 are connected in series, whereby the diode V7 is connected on the collector side of PNP transistor Q2 and the relay K2 is connected collector side of NPN transistor Q3 and the conducting direction of diode V7 runs from the collector of PNP transistor Q2 to the collector of NPN transistor Q3. Furthermore a recovery diode V6 is connected in parallel to relay K2 whose conducting direction runs in opposition to the conducting direction of diode V7.

The key button S1, which in this example is equipped with collateral contacts, namely a break contact s1ö and a make contact s1s, is connected to the driver stage via a line 13. In a similar way, key button S2 which is likewise equipped with collateral contacts, namely a break contact s2ö and a make contact s2s, is connected to the driver stage via a line 14. In lines 13 and 14, which lead as well to the astable circuit or multivibrator 1, break contacts k1ö and k2ö are arranged, whereby a diode V10 is connected in series to break contact k1ö and a diode V11 is connected in series to break contact k2ö whose conducting directions are oriented in opposition. According to this design example, further lines 17 and 18 run in parallel to lines 13 and 14 which similarly connect key button S1 on the one hand and key button S2 on the other hand to the astable circuit or multivibrator 1. Make contacts k2s and k1s of relays K2 and K1 are provided in lines 17 and 18. In a similar way diodes V9 and V10 are connected in series to make contacts k2s and k1s, which in turn are oriented with their conducting directions opposite to one another, so that diodes V9 and V10 on the one hand and diodes V11 and V12 on the other hand are oriented with their conducting directions in opposition.

The driver stage 2 is connected to line 13 via a line 21 whereby line 21 is connected between the emitters of PNP transistors Q1 and Q2 and has a diode V1, whose conducting direction is oriented to be from the key button S1 to the connecting line between the emitters of PNP transistors Q1 and Q2. Between the driver stage 2 and line 14, a line 22 is provided which likewise has a diode V8 and is connected between the emitter sides of NPN transistors Q3 and Q4 so that the diode V8 has its conducting direction from the emitters of the NPN transistors Q3 and Q4 to line 14.

The astable circuit or multivibrator has two NPN transistors Q5 and Q6 the base of each one being connected between a resistance R5 or R12 and a diode V15 or V14 respectively. The collector of the NPN transistor Q5 is connected in series with a resistance R6, against which the collector of NPN transistor Q6 is connected in series with the resistance R11.

The resistance R6 is connected in parallel with two resistances R7 and R8 and the resistance R11 is connected in parallel with two resistances R9 and R10. A diode V13 is connected between resistances R6 and R7 and a diode V16 is connected between resistances R10 and R11 whereby the conducting direction of diode V13 runs from resistance R7 to resistance R6 and the conducting direction of diode V16 runs from resistance R10 to resistance R11.

Furthermore, a capacitor C1 is connected between resistances R7 and R8 and a capacitor C2 is connected between resistances R9 and R10, so that resistances R8 and R9 are connected in series with diodes V14 and V15 whose conducting direction runs in the direction of the bases of NPN transistors Q5 and Q6.

Furthermore, a capacitor C3 and a resistance R13 are connected in parallel with resistance R11, so that the positive plate of capacitor C3 is oriented on the side of resistance R11 and the negative plate of capacitor C3 is on the side of resistance R13, and which on the output side is connected with the emitter of NPN transistor Q6 and the resistance R12 connected in parallel with it.

The way the safety circuit described above operates is essentially as follows:

First of all it should be noted that the safety circuit, according to the design example described, is operated with a direct current. If the button keys S1 and S2 of the actuation device, for example a two handed actuation device, are not pressed, then the safety circuit is at rest. Power is supplied via closed contacts of the connection, simplified by so-called ESB (external start condition), to known feedback loops, namely with the connection of the safety circuit to the rest of the control system of the machine, for example a metal working machine that may be dangerous. Furthermore, the astable circuit or multivibrator 1 is supplied with voltage V+ via the break contact k2ö of relay K2, the diode V11 and the break contact s2ö of key button S2. The astable circuit or multivibrator 1 is supplied with voltage V− via the break contact k1ö of relay K1, the diode V10 and the break contact s1ö of key button S1.

The astable circuit or multivibrator 1 oscillates in this condition and generates two square wave signals, namely signal 1 and signal 2 which are complementary and inverse to one another and which each persist for the same length of time. In this steady state, capacitor C3 takes up the energy or stores it, energy which it requires in order to supply the astable circuit or multivibrator within a maximum 500 ms actuation time for key buttons S1 and S2. If the two key buttons S1 and S2 are not actuated within this actuation time, that is practically simultaneously, the capacitor C3 is discharged prematurely, so that the astable circuit or multivibrator no longer supplies the relays K1 and K2, so that further operation of the safety circuit would be interrupted. The diodes V1 and V8, in this condition, in which the key buttons S1 and S2 are inoperative, block the flow of current for the driver stage 2, so that the relays K1 and K2 are not activated. If, in this condition, a break contact k1ö and k2ö of relays K1 or K2 is not closed, the astable circuit or multivibrator would not work. Since the relays K1 and K2 are restricting relays, a possible contact failure will be detected.

With actuation of the key buttons S1 and S2 within the actuation time of 500 ms, the driver stage 2 is supplied with a voltage V+ and V− via the make contacts s1s and s2s. The diodes V1 and V8 are now polarised in a forward direction. In this condition, the energy stored in capacitor C3 supplies the astable circuit or the multivibrator for the length of the actuation time which is maximum 500 ms.

With the actuation of key buttons S1 and S2 within the maximum actuation time of 500 ms, relays K1 and K2 are activated and supply the astable circuit or multivibrator 1 via diodes V9 and V12 with a voltage. In this way the square wave signals, signal 1 and signal 2 from the astable circuit or multivibrator control the driver stage 2 by providing dynamic switching of the relays as follows: In a first state, signal 1 is high and signal 2 is low, whereby transistors Q1 and Q4 conduct and the relay K1 is activated, so that the contacts of the relay switch over accordingly.

In a second state, signal 1 is low and signal 2 is high, so that transistors Q2 and Q3 conduct and relay K2 is activated, so that its contacts switch over accordingly.

If the relays K1 and 2 are activated, then the astable circuit or multivibrator is supplied with power via the make contacts k1s and k2s of relays K1 and K2.

In the first state mentioned above, the current flows from A1 via the make contact sls of key button S1, the diode V1, the transistor Q1, the diode V4 through the relay K1 to the transistor Q4 and from the transistor Q4 via the diode V8 and the make contact s2s of the key button S2 to A1. In this way relay K1 is activated.

In the second state mentioned above, the current flows from A1 via the make contact sis of key button S1, the diode V1 to the transistor Q2 and from the transistor Q2 via diode V7 through the relay K2 and from there via transistor Q3 to diode V8, in order to flow to A2 via the make contact s2s of key button S2. In this state, relay K2 is activated.

The frequency of the astable circuit or multivibrator 1 is preferably 1000 Hz and consequently changes the state of the signals, signal 1 and signal 2 every 0.5 ms. Limited by the fall time of relays K1 and K2 and the magnetic energy stored in the respective relay coil, which maintains the mutual induction current flow within the triggering time intervals via the recovery diode VS for relay K1 and the recovery diode V6 for relay K2, both relays K1 and K2 remain activated. This condition is maintained until such time as the key buttons S1 and S2 are let loose. Now, diodes V1 and V8 block the flow of current and the driver stage 2 is no longer supplied with a voltage. Relays K1 and K2 are released, so that the neutral, at-rest condition of the equipment and the safety circuit is arrived at.

Owing to different tolerances, either the transistor Q5 or the transistor Q6 is controlled by the astable circuit or by the multivibrator 1 at the turn on moment. For the case where the transistor Q6 is controlled, the collector of transistor Q6 is at low potential corresponding to signal 2. Then a charging current flows, which is defined by resistance R9, via capacitor C2. The base of transistor is at first at low potential so that transistor Q5 is blocked. Because of this, the collector of transistor Q5 is at high potential corresponding to signal 1. Because of the charging current that is flowing through capacitor C2, the potential at the base of transistor Q5 rises until the transistor is enabled. Then signal 1 falls to a low potential and simultaneously a charging current flows via capacitor C1, which is defined by resistance R8.

The base of transistor then falls back to a low potential and blocks transistor Q6, whereby signal 2 goes to a high potential.

This process runs on cyclically. Provided that R9×C2= R8×C1, signal 1 progresses with respect to signal 2 in such a way that the high and low phases continue for the same length of time and are oriented inversely to one another.

The diodes V13, V14, V15 and V16 which are in the safety circuit described above are used to speed up the transit time of signals 1 and 2. The operating points are set through resistances R5 and R12.

From the following consideration of faults, further features and functions of the safety circuit according to the invention come to light. This fault examination shows, first and foremost, that all conceivable faults from the key buttons up to the start of the ESB (external start condition) of the external machine control system are recognised and in every case through switching is prevented.

The dangerous movement to be guarded against is disengaged via two undesignated starting points of the safety equipment. Both the redundant starting points and the contact making circuits can also be developed as contact breaking circuits.

Examination of faults

| | | | | |
|---|---|---|---|---|
| 1.) | S1: | $^1$g<br>line break<br>$^2$S | make contact<br><br>make contact | Multivibrator running in steady position. No plus when S1 actuated<br>Short circuit |
| 2.) | S1: | bridged<br>$^3$S<br>line break<br>$^4$S | break contact<br><br>break contact | Multivibrator not working in steady position. (no minus)<br>Short circuit when actuated |
| 3.) | S1: | | | |
| 4.) | S1: | bridged<br>$^5$S<br>line break<br>$^6$S | make contact<br><br>make contact | Multivibrator running in steady position. No minus when S2 actuated<br>Short circuit |
| 5.) | S2: | | | |
| 6.) | S2: | bridged<br>$^7$S<br>line break<br>$^8$S | break contact<br><br>break contact | Multivibrator not working in steady position. (No plus)<br>Short circuit when actuated |
| 7.) | S2: | | | |
| 8.) | S2: | bridged<br>$^9$Q<br>break<br>$^1$Q | B<br><br>B–C | Q1 Blocked, no base drive for Q3. K2 doesn't come on. NO output on channel 1 and channel 2.<br>Q3 and Q4 Permanently enabled. Short circuit |
| 9.) | Q1: | | | |
| 10.) | Q1: | bridge<br>$^1$Q<br>break<br>$^1$Q | B<br><br>B–B | via Q2 and Q5. K1 and K2 do not come on. No output on channel 1 and channel 2.<br>Q1 blocked (see fault 9) |
| 11.) | Q1: | | | |
| 12.) | Q1: | bridge<br>$^1$Q<br>break<br>$^1$Q | C<br><br>B–C | Q1 blocked (see fault 9)<br>Q1 blocked (see fault 9)<br>Q1 conducts, short circuit via Q2 and Q3. K1 |
| 13.) | Q1: | | | |

-continued

| # | Component | Fault type | | Description |
|---|---|---|---|---|
| 14.) | Q1: | bridge | | doesn't come on. No output on channel 1 and channel 2. |
| | $Q_1$ | B | | Q2 blocked. K1 doesn't come on. No output on |
| 15.) | Q2: | break | | channel 1 and channel 2. |
| 16.) | $Q_1$ | B–C | | Q2 Emitter - collector bridged. Short circuit |
| | Q2: | bridge | | via Q3. K1 doesn't come on. No output on channel 1 and channel 2. |
| 17.) | $Q_1$ | B | | Q2 blocked (see fault 15) |
| | Q2: | break | | |
| 18.) | $Q_1$ | B–B | | Q2 blocked (see fault 15) |
| | Q2: | bridge | | |
| 19.) | $Q_1$ | C | | Q2 blocked (see fault 15) |
| | Q2: | break | | |
| 20.) | $Q_2$ | B–C | | Q2 conducts, short circuit via Q2 and Q3. K1 |
| | Q2: | bridge | | doesn't come on. No output on channel 1 and channel 2. |
| | $Q_2$ | B | | Q3 blocked. K2 doesn't come on. No output on |
| | Q3: | break | | channel 1 and channel 2. |
| 22.) | $Q_2$ | B–C | | Q3 emitter - collector bridged. Short circuit |
| | Q3: | bridge | | via Q2. K1 does not come on. No output on channel 1 and channel 2. |
| 23.) | $Q_2$ | B | | Q3 blocked (see fault 21) |
| | Q3: | break | | |
| 24.) | $Q_2$ | B–B | | Q3 blocked (see fault 21) |
| | Q3: | bridge | | |
| 25.) | $Q_2$ | C | | Q3 blocked (see fault 21) |
| | Q3: | break | | |
| 26.) | $Q_2$ | B–C | | Q3 conducts, short circuit via Q2 and Q3. K1 |
| | Q3: | bridge | | doesn't come on. No output on channel 1 and channel 2. |
| 27.) | $Q_2$ | B | | Q4 blocked. K2 doesn't come on. No output on |
| | Q4: | break | | channel 1 and channel 2. |
| 28.) | $Q_2$ | B–C | | Q4 Emitter - collector bridged. Short circuit |
| | Q4: | bridge | | via Q5. K2 doesn't come on. No output on channel 1 and channel 2. |
| | Q4: | break | | |
| | $Q_3$ | B–B | | Q4 blocked (see fault 27) |
| 30.) | Q4: | bridge | | |
| | $Q_3$ | C | | Q4 blocked (see fault 27) |
| 31.) | Q4: | break | | |
| | $Q_3$ | B–C | | Q4 conducts, short circuit via Q4 and Q5. K2 |
| 32.) | Q4: | bridge | | doesn't come on. No output on channel 1 and channel 2. |
| | $Q_3$ | B | | Q5 blocked. K1 doesn't come on. No output on |
| 33.) | Q5: | break | | channel 1 and channel 2. |
| | $Q_3$ | B–C | | Q5 emitter - collector bridged. Short circuit |
| 34.) | Q5: | bridge | | via Q4. K2 doesn't come on. No output on channel 1 and channel 2. |
| | $Q_3$ | B | | Q5 blocked (see fault 33( |
| 35.) | Q5: | break | | |
| | $Q_3$ | B–B | | Q5 blocked (see fault 33) |
| 36.) | Q5: | bridge | | |
| | $Q_3$ | C | | Q5 blocked (see fault 33) |
| 37.) | Q5: | break | | |
| | $Q_3$ | B–C | | Q5 conducts, Short circuit via Q4 and Q5. K2 |
| 38.) | Q5: | bridge | | doesn't come on. No output on channel 1 and channel 2. |
| | $Q_3$ | B | | Q6 blocked, no base drive for Q5. K2 doesn't |
| 39.) | Q6: | break | | come on. No output on channel 1 and channel 2. |
| | $Q_4$ | B–C | | Q2 and Q5 permanently enabled. Short circuit |
| 40.) | Q6: | bridge | | via Q3 and Q4. K2 does not come on. No output on channel 1 and channel 2. |
| | $Q_4$ | B | | Q6 blocked (see fault 39) |
| 41.) | Q6: | break | | |
| | $Q_4$ | B–B | | Q6 blocked (see fault 39) |
| 42.) | Q6: | bridge | | |
| | $Q_4$ | C | | Q6 blocked (see fault 39) |
| 43.) | Q6: | break | | |
| | $Q_4$ | B–C | | Q6 conducts, short circuit via Q4 and Q5. K2 |
| 44.) | Q6: | bridge | | doesn't come on. No output on channel 1 and channel 2. |
| | $Q_4$ | V | high resistance | V9 blocked, K1 doesn't come on. No Output on |
| 45.) | V9: | | | channel 1 and channel 2 |
| | $Q_4$ | V | low resistance | Short circuit via Q4 - V10 - V9 - Q3. K2 |
| 46.) | V9: | | | doesn't come on. No output on channel 1 and channel 2 |
| | $Q_4$ | V | high resistance | V10 blocked, K1 doesn't come on. No output on |
| 47.) | V10: | | | channel 1 and channel 2 |

| | | | |
|---|---|---|---|
| 48.) | 4 V V10: | low resistance | Short circuit via Q2 - V9 - V10 - Q5. K1 doesn't come on. No output on channel 1 and channel 2 |
| 49.) | 4 V V11: | high resistance | V11 blocked, K2 doesn't come on. No output on channel 1 and channel 2 |
| 50.) | 5 V V11: | low resistance | Short circuit via Q4 - V12 - V11 - Q3. K2 doesn't come on. No output on channel 1 and channel 2 |
| 51.) | 5 V V12: | high resistance | V12 blocked, K2 doesn't come on. No output on channel 1 and channel 2 |
| 52.) | 5 V V12: | low resistance | Short circuit via Q2 - V11 - V12 - Q5. K1 doesn't come on. No output on channel 1 and channel 2 |

We claim:

1. A safety circuit with an actuating device for electrical appliances, whereby the actuation device is capable of being operated by means of two key buttons or switch stacks, wherein the two key buttons each have a break contact (s1ö, s2ö) and a make contact (s1s, s2s) and act in combination with an associated transistor driver stage with transistors (Q1, Q2, Q3, Q4), wherein the driver stage has two relays (K1, K2), and wherein an astable circuit or multivibrator with an elementary frequency of substantially 1000 Hz for the generation of two complementary square wave signals is connected to the relays (K1, K2) via contacts (k1, k2) so that the relays (K1, K2) are dynamically switchable.

2. A safety circuit according to claim 1, further including a capacitor (C3), which is so dimensioned that, in a steady state, it stores the energy that is required to provide the astable circuit or multivibrator with a voltage within the maximum 500 ms actuation time of the two key buttons (S1, S2).

3. A safety circuit according to claim 2, wherein, with the actuation of the two key buttons (S1, S2) within a maximum actuation time of 500 ms., the driver stage is provided with a voltage V+ and V− via the make contacts (s1s, s2s) of the key buttons (S1, S2) and the relays are activated.

4. A safety circuit according to claim 2 or 3, wherein the capacitor (C3) is integrated into the astable circuit or multivibrator.

5. A safety circuit according to one of claims 1 to 3, wherein the astable circuit or multivibrator has a pulse duty factor $T_{in}$ to $T_{out}$ of 50% to 50%.

6. A safety circuit according to one of claims 1 to 3, wherein the astable circuit or multivibrator generates square wave signals (Signal 1, Signal 2) with an edge steepness of up to 10 $\mu$s, preferably smaller than 1 $\mu$s.

7. A safety circuit according to one of claims 1 to 3, wherein, a first diode (V1) is provided between the first key button (S1) and the driver stage and a second diode (V8) is provided between the second key button (S2) and the driver stage whereby the diodes (V1, V8) block the flow of current to the driver stage when the key buttons are inoperative.

8. A safety circuit according to one of claims 1 to 3, wherein, the square wave signals (Signal 1, Signal 2) from the astable circuit or multivibrator (1) trigger the driver stage in such a way that the square wave signals (Signal 1, Signal 2) are alternately high and low, so that either the first relay (K1) or the second relay (K2) is energised.

9. A safety circuit according to one of claims 1 to 3, wherein, the astable circuit or multivibrator are supplied with power via the relay make contacts (K1, K2) if the relays (K1, K2) are activated.

10. A safety circuit according to claim 1, wherein the two complementary square wave signals (signal 1, Signal 2) persist over similar lengths of time and time are inverse to one another.

* * * * *